3,585,252
NOVEL HYDROCARBON PREPARATION PROCESS
Joseph P. Kennedy, Cranford, N.J., assignor to Esso Research and Engineering Company
No Drawing. Filed Jan. 17, 1969, Ser. No. 792,127
Int. Cl. C07c 9/00
U.S. Cl. 260—676                                    15 Claims

ABSTRACT OF THE DISCLOSURE

Highly branched hydrocarbons suitable as high-octane fuels can be obtained rapidly and efficiently by a coupling reaction in which reactive organo-halides are contacted with an organo aluminum, under reaction conditions, in a non-reactive solvent.

FIELD OF THE INVENTION

This invention relates to a coupling reaction between organo halides and organo aluminum compounds including organo aluminum halides, in an inert solvent. More specifically, this invention relates to the production of desired hydrocarbons, both acyclic and alicyclic by the coupling of aliphatic, cycloaliphatic, or arylalkyl halides with organo aluminum compounds, preferably aluminum trialkyls in a non-reactive solvent. In a particularly preferred embodiment, this invention may be utilized to produce quaternary substitution on a carbon atom. The desired hydrocarbons, including those containing quaternary substitution on a carbon atom may be rapidly and efficiently obtained by a coupling reaction in which organo halides such as a tertiary alkyl halide, are reacted, in an inert solvent, with an organo aluminum compound such as an aluminum trialkyl.

PRIOR ART

There is little art relating to a coupling reaction in which organo halides interact with organo aluminum to produce a desired hydrocarbon and in particular quaternary substitution on a carbon atom. Recently, in an article entitled "Reaction of Trialkyl Aluminums with Halo Hydrocarbons" Journal of Organic Chemistry 31 908 (1966), the author discusses this type of reaction, especially reactions of trialkyl aluminums with various organo halogens in the presence of highly polar ether solvents. In a typical reaction an aluminum triethy-ethylether complex and a benzyl halogen were reacted and produced various alkylation products in low yield and large proportions of reduced hydrocarbons. This article is of interest since it represents the first teaching that this type of coupling reaction may be performed. There were, however, problems with the reaction. The author noted that his initial attempts to mix triethyl aluminum and benzotrichloride resulted in an explosive reaction which, in turn, produced complex and varied reaction products. To counteract these problems, ethyl ether was added to the mixture of organic halide and excess triethyl aluminum. The resulting reactions after the addition of ethyl ether were far smoother and produced less of a variety of products.

The data obtained, however, still substantiated the presence of problems with this type of coupling reaction; for instance, from Table 1 of the article it is readily observed that in over 20 reactions between various organo halides and triethyl aluminum there were no instances wherein substantially 100% of the predictable product is produced. Typically, the reaction of $C_7H_7Br$ with triethyl aluminum produced only 74% of 7-ethyl-cycloheptatriene, the predicted product, and 14% of cycloheptatriene. The remainder of the yield, some 12%, was not disclosed.

According to this invention, it has unexpectedly been found that if reactive organo halides are contacted with an organo aluminum at reaction conditions, within a nonreactive or inert solvent, preferably selected from the group consisting of:

(a) normal primary alkyl halides and branched primary alkyl halides, and
(b) aromatic halides the product is substantially 100% of the predictable product as determined by the general equation. The general equation will subsequently be included and discussed at length. Undesired side reactions such as elimination and dehydrohalogenation are virtually nonexistent.

Such a reaction would be especially valuable if one desires to obtain quaternary substitution on a carbon atom. In the past quaternary carbon atoms were produced by the reaction between a tertiary halide and a Grignard reagent, i.e. RMgX. The problems with this reaction are well known; yield of quaternary carbon atom is low and disturbing side reactions such as elimination, compete with the desired or predictable reaction.

An extremely broad temperature range may be utilized for the reaction of the instant invention; temperatures down to $-100°$ C. and a high of $+200°$ C. may be used effectively. In fact, it is an advantage of the instant invention that in substantially all cases, extremely low temperature of reaction may be utilized; this avoids any requirement for external heat and indicates the high reactivity of the components within the solvent. Pressure may vary broadly from subatmospheric to superatmospheric; pressures must, however, be sufficient to maintain the reactants and solvent in the liquid phase.

With more particularity the instant invention requires the contacting under reaction conditions within an inert solvent, of an organo halide and an organo aluminum, the term organo aluminum is intended to include organo aluminum halides and hydrides. The general equation for the most preferred reaction is as follows:

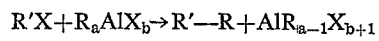

X may be any halogen but is preferably one with an atomic number above 9, i.e. chlorine, bromine or iodine, R' and R are hydrocarbon radicals, either alkyl, alkenyl or aralkyl; $a$ is an integer from 1 to 3 and $a+b$ equals 3.

Specifically, R'X may be a primary halide in which case R'X has the following general configuration

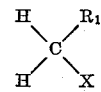

wherein X is halogen, preferably Cl, Br, or I. The third constituent, $R_1$, is determinative of the reaction rate and efficiency. Generally, if the third constituent is a normal aliphatic radical or group there will be no reaction. If the third constituent is unsubstituted aromatic or vinyl ($CH_2=CH$) group a reaction will take place, although it will not be as rapid or efficient as reactions with secondary or tertiary organo halides.

Thus, aryl radicals having 6 to 20 carbon atoms may be used for $R_1$, as well as $C_6$ to $C_{20}$ haloaryls. Regarding aliphatic compounds the vinyl radical may be used successfully as well as isoalkyls and isoalkanyls having 3 to 10 carbon atoms which are capable of rearranging to form a stable carbonium ion, such as the isopropyl radical which rapidly rearranges to form a tertiary carbonium ion. Halogenated isoalkyls and isoalkanyls may also be utilized but only primary halogens may be added since secondary or tertiary halogens would cause competing reactions. The preferred halogens are chlorine, bromine and iodine, i.e. those having atomic numbers above 9; it is preferred not to substitute more than two halogens for hydrogens.

In the event that R'X is a secondary halide it would have the general configuration

X, again, would be halogen, preferably chlorine, bromine or iodine. $R_2$ and $R_3$ would be radicals independently selected from the group consisting of $C_6$ through $C_{20}$ aryls, $C_6$ through $C_{20}$ haloaryls, $C_1$ through $C_{10}$ alkyl, $C_2$ through $C_{10}$ alkenyl, primary $C_2$ through $C_{10}$ haloalkyls, primary $C_2$ through $C_{10}$ haloalkenyls, $C_3$ through $C_8$ cycloalkenyls, and $C_3$ through $C_8$ cycloalkyl. It should be noted that when using a secondary group for R' both normal and isoalkyls and alkenyls may be used effectively; this is contrary to when R' is a primary group in which case only isoalkyls and isoalkenyls capable of rearranging to form a relatively stable carbonium ion such as a tertiary carbonium ion may be utilized.

When R'X is a tertiary halide it will have the general configuration

X is halogen, preferably chlorine, bromine or iodine and $R_2$, $R_3$ and $R_4$ may be selected independently from the previously mentioned configurations available for $R_2$ and $R_3$.

Most preferred radical for $R_1$ is phenyl. Regarding $R_2$, $R_3$ and $R_4$ it is preferred to use $C_1$ to $C_6$ alkyls and most preferred to use $C_1$ to $C_3$ alkyls, a tertiary halide is preferred to a secondary which in turn is preferred to a primary.

Typical halides which may be used are:

Trimethyl chloromethane
Dimethyl ethyl chloromethane
Methyl ethyl isopropyl chloromethane
Diethyl decyl chloromethane
Dimethyl phenyl chloromethane
Dimethyl cyclohexyl chloromethane
Dimethyl p-chlorophenyl chloromethane
Dimethyl 2,4-dichlorophenyl chloromethane
Dimethyl cyclopropyl chloromethane
Dimethyl chloromethyl chloromethane R is an organo aluminum which may have several alternative configurations. The most preferred configuration for the organo aluminum is a trialkyl aluminum having the general configuration

wherein $R_5$, $R_6$ and $R_7$ are independently selected from the grouping consisting of $C_1$ to $C_8$ alkyls. It is most preferred that $R_5$, $R_6$ and $R_7$ be alkyl, especially $C_1$ through $C_4$ alkyls.

Alternatively, R may be an organo alumino halide which has the configuration $Al(R_8)_2X$, wherein X is halogen, preferably chlorine, bromine or iodine and $R_8$ is selected from the group consisting of methyl, ethyl and isobutyl. Finally, R may be an organo aluminum hydride having the configuration $Al(isobutyl)_2$–H.

The trialkyl aluminum is most preferred; especially with $R_5$, $R_6$ and $R_7$ as $C_1$–$C_4$ alkyl radicals.

In order to produce a quaternary carbon atom a tertiary halide must be reacted with the corresponding trialkyl aluminum, a typical reaction of this type is as follows:

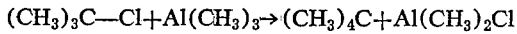

The chain length of the constitutents of the alkyl halide may be varied to produce the desired quaternary compound; most preferred tertiary alkyl halides are those in which $R_2$, $R_3$ and $R_4$ are $C_1$–$C_3$. The most preferred trialkyl aluminums are those in which $R_4$, $R_5$ and $R_6$ are $C_1$–$C_4$.

Regarding the inert solvent, this is critical to the invention since the reaction will not proceed to a substantially 100% production of the quaternary compound or other desired hydrocarbon if the proper solvent is not utilized. For most effective results the solvent should be polar and inert. By polar, it is meant that the solvent must have a dielectric constant of at least 8. The dielectric constant of liquid methyl chloride is 12.93 (at –25° C.). To be inert the solvent should be substantially non-reactive with the reactants. The polarity of the solvent is important to obtain fast reaction rates. The solvent should not coordinate with the organo aluminum in a manner such as diethyl ether which forms aluminum alkyl-etherates. Nonpolar solvents may also be utilized, however, the rates of reaction are slower under these conditions. Apparently the reaction involves ionic intermediates and consequently solvation of the ionic species promotes the reaction.

Generally preferred are halogenated solvents having a maximum of about 15 carbon atoms selected from normal primary alkyl halides and branched alkyl halides which do not have adjacent substitution, and aromatic halides. Examples of such solvents include the previously mentioned methyl chloride, ethyl chloride, n-propyl chloride, vinyl chloride, 1,2-dichloroethane, chlorobenzene, chlorotoluene, bromobenzene, fluorobenzene, ortho-dichlorobenzene and 1,3-dichloropropane. Non-halogenated hydrocarbons having 1 to 15 carbons may also be used, i.e. propane, n-pentane, n-hexane, n-heptane, cyclohexane, cyclopentane, methylcyclohexane, etc.

The solvent must, of course, have the ability to dissolve the reactants and should be liquid at the operating temperatures utilized for the instant process. It is desirable that the solvent have sufficient volatility to allow its removal at temperatures below the decomposition temperature of the various products. The concentration of the reactants in the solvent may vary from 1 to 80% by weight, preferably from 10 to 50% by weight.

Wide temperature ranges may be used for the reaction of the instant invention; broadly, temperatures between –100 and +200° C. are applicable. Preferred temperatures would range between –80 and +100° C. and most preferred temperatures, between –60 to +20° C. Pressures should be sufficient to maintain the solvent in liquid phase at the various temperatures which may be utilized.

The reaction time may vary between 1 second and 1 day but generally the reaction proceeds very rapidly and substantially to 100% and the product is produced in about 2 to 60 minutes. The reactants are introduced into the inert solvent in the following fashion: The organo aluminum compound, i.e. trimethyl aluminum is dissolved in the solvent, methyl chloride, at a suitable temperature, –50° C. Subsequently, the organo halide, i.e. tert.-butylchloride is introduced gradually. Reaction is instantaneous and the formation of the predicted product, neopentane and $AlMe_2Cl$ can be detected by NMR spectroscopy. The solution then is treated with methanol to decompose the pyrophoric aluminum compound and the desired product, neopentane, can be recovered by distillation.

The reaction my take place in conventional equipment such as any of the following: stirred glass reactor, or Teflon coated steel, or high quality stainless steel. Products are recovered by known techniques such as distillation, precipitation, extraction, etc.

The following mechanism is offered as a possible explanation for the results achieved with the instant invention. There is no intention, however, to be bound by any particular mechanism. Broadly, the reaction proceeds as follows:

The rate of reaction is determined by the R—Cl bond strength (dissociation energy of the R—Cl and the ionization potential of the alkyl radical) and is aided by solvation by the polar solvent. The stronger the R—Cl bond the more difficult it is to produce the necessary ion pair, the slower the reaction. The higher the carbonium ion stability in the transition state the faster the reaction will proceed. Thus, for example,

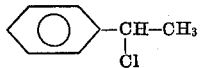

which yields a relatively stable

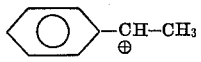

carbonium ion, rapidly and quantitatively gives

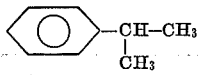

(cumene), whereas under essentially the same conditions, isopropyl chloride

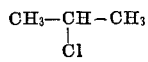

changes very slowly in the corresponding

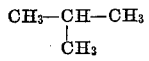

(isobutane) because the

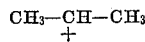

ion is relatively less stable.

It is of interest that isobutyl chloride

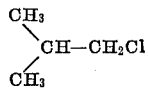

gives neopentane

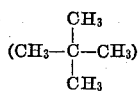

when reacted with Al(CH$_3$)$_3$ and not 2-methyl-butane

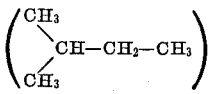

The reason for this is that the initially formed carbonium ion

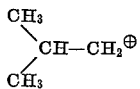

rapidly rearranges by hydride shift to

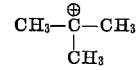

a much more stable carbonium ion, which then captures the Me group of the AlMe$_3$Cl$^\ominus$ gegen-ion to give neopentane, the observed product.

SPECIFIC EXAMPLES.—EXAMPLE 1

Separate solutions in methyl chloride, of organo halides and Al(CH$_3$)$_3$ were prepared at —78° C. in NMR tubes under nitrogen atmosphere. Both solutions were one molar; and 2 ml. in volume. Following this the organo halide solution, which was a tertiary alkyl halide, was added at —78° C. to the alkyl aluminum. The NMR tubes were then sealed with a torch, the reactants were maintained at —78° C. A substantially instantaneous reaction took place; nuclear magnetic resonance spectroscopic analysis of the product was then made at —78° C.

The tertiary alkyl halides would predictably, when subjected to alkylation, produce a quaternary-carbon-atom containing molecule. The results which are outlined in Table I were entirely consistant with this prediction.

TABLE I.—SYNTHESIS OF QUATERNARY-CARBON-ATOM-CONTAINING MOLECULES

| Run No.: | Alkyl halide | Alkyl aluminum | Product | Remarks |
|---|---|---|---|---|
| 1 | C—C(C)(C)—Cl | Al(CH$_3$)$_3$ | C—C(C)(C)—C | Quantitative clean reaction in less than 10' at —78° C. |
| 2 | C—C—C(C)—Cl | Same | C—C—C(C)—C | Quantitative clean reaction at —78° C. |
| 3 | C—C—C—C(C)—Cl | do | C—C—C—C(C)—C | Do. |
| 4 | C—C(C)(C)—C—Cl | do | C—C(C)(C)—C—C | Do. |
| 5 | C—C(C)(C)—C(C)—Cl | do | C—C(C)(C)—C(C)—C | Do. |
| 6 | cyclopentyl-C(Cl) | do | cyclopentyl-C(C) | Do. |
| 7 | cyclohexyl-C(Cl) | do | cyclohexyl-C(C) | Do. |

From the above it is readily apparent that a variety of different quaternary-carbon-atom containing molecules can be produced; the products included aliphatic and cycloaliphatic compounds such as neopentane, neohexane or 2,2-dimethyl butane, neoheptane or 2,2-dimethyl pentane, 2,2,3-trimethyl butane, 2,2,3,3-tetra methyl butane, 1,1-dimethyl cyclopentane and 1,1-dimethyl cyclohexane.

EXAMPLE 2

In this example the organo halides used were varied while the alkyl aluminum was identical to Example 1, reaction conditions and quantities were also identical with Example 1. The organo halides included aryl alkyl halides, alkyl aryl methyl halides, allylic halides, primary aliphatic halides, and secondary aliphatic halides. Table II illustrates the results which were achieved.

if an isopropyl radical is joined to a halogen, a reaction will take place. Most efficient reaction occurs with tertiary halides, benzylic halides and substituted allylic halides. Reaction is slower with secondary halides and unsubstituted allylic halides whereas no reaction takes place with primary halides unless there is a possibility for rearrangement through a more stable carbonium ion. Thus, for example, ethyl chloride does not react because the ethyl carbonium ion cannot rearrange to a more stable species, however, the isobutyl chloride rearranges because the isobutyl carbonium ion rearranges to the more stable tertiary carbonium ion.

EXAMPLE 3

In this example, normal and isoalkyl aluminums were reacted with tertiary butyl chloride. The other reaction

TABLE II.—SYNTHESIS OF VARIOUS HYDROCARBONS

| Run No.: | Organo halide | Alkyl aluminum | Product | Remarks |
|---|---|---|---|---|
| 1 | C$_6$H$_5$—CH$_2$Cl | Al(CH$_3$)$_3$ | C$_6$H$_5$—CH$_2$—CH$_3$ | Incomplete reaction because of polybenzyl (C$_6$H$_5$—CH$_2$—)$_n$ formation; about 20% ethylbenzene formed in the temperature range −78° to +20° C. |
| 2 | C$_6$H$_5$—CH(CH$_3$)—Cl | Same | C$_6$H$_5$—CH(CH$_3$)—CH$_3$ | Complete clean reaction at N-78° C. |
| 3 | CH$_2$=CH—CH$_2$—Cl | do | CH$_2$=CH—CH$_2$—CH$_3$ | No reaction at −78° C. for 24 hrs; slow reaction at room temp.: 30% conversion after 4 days; 100% conversion after 9 days. |
| 4 | (CH$_3$)$_2$CH—Cl | do | (CH$_3$)$_2$CH—CH$_3$ | No reaction at −78°; slow reaction when heated to room temperature: 50% conversion after 9 days. |
| 5 | (CH$_3$)$_2$CH—CH$_2$Cl | do | CH$_3$—C(CH$_3$)$_2$—CH$_3$ | No reaction for 2 hours at −78° C.; complete conversion after 4 days at room temperature. |
| 6 | CH$_3$—CH$_2$Cl | do | | No reaction at room temperature for 2 weeks. |

From the above it is apparent that secondary aryl alkyl methyl halides react more effectively than primary aliphatic halides with an alkyl aluminum. Also from the above it is seen that primary halides hardly react at all with the tertiary alkyl aluminum. Run No. 2 in which a secondary halide was utilized produced a more effective and rapid reaction than Run No. 1 in which a primary halide was utilized. Allylic halides, as illustrated by Run No. 3 will also react but not so rapidly as a tertiary halide. Primary halides, which do not rearrange, Run No. 6, produce no reaction at all, Run No. 5 illustrates that conditions and quantities were identical to Example 1. The results are summarized in Table III.

TABLE III.—SYNTHESIS OF HYDROCARBONS WITH VARIOUS ALUMINUM TRIALKYLS

| Run No.: | Alkyl halide | Alkyl aluminum | Product | Remarks |
|---|---|---|---|---|
| 1 | C—C(C)(C)—Cl | Al(C$_2$H$_5$)$_3$ | C—C(C)—C—C | Immediate reaction at −78° C. In this experiment the (Al(C$_2$H$_5$)$_3$)$_2$ to tert.-Butyl chloride ratio was ½ to 1. |
| 2 | Same | Same | Same as above | Immediate reaction at −78° C. In this experiment the (Al(C$_2$H$_5$)$_3$)$_2$ to tert.-Butyl chloride ratio was, as usual 1:1. |
| 3 | do | Al(iC$_4$H$_9$)$_3$ | C—C(C)—C(C)—C | Partial reaction at −78° C. In this experiment the Al(iC$_4$H$_9$)$_3$ to tert.-Butyl chloride ratio was 1:1. |

The above table indicates that a variety of alkyl aluminums may be used with successful results; a successful reaction was achieved with both a normal trialkyl aluminum and a branched chain tertiary alkyl aluminum.

EXAMPLE 4

In this example the exact conditions and quantities of Example 1 were used except that the alkyl aluminum was varied. The ratio of trimethyl aluminum, which exists as a dimer in solution, to tertiary butyl chloride was varied from 2 to 1 to 2 to 6. Table IV, included below, outlines the results.

TABLE IV.—SYNTHESIS OF NEOPENTANE (CH₃)₄C WITH VARIOUS RATIOS OF TERT.-BUTYL CHLORIDE TO ALUMINUM TRIMETHYL

| Run No.: | Moles of $(Al(CH_3)_3)_2$ used | Moles of tert.-butyl chloride used | Products |
|---|---|---|---|
| 1 | 1 | 1 | 1 mole $CH_3-\underset{\underset{CH_3}{\mid}}{\overset{\overset{CH_3}{\mid}}{C}}-CH_3$ (neopentane) plus $Al_2(CH_3)_5Cl$. |
| 2 | 1 | 2 | 2 moles neopentane plus $(Al(CH_3)_2Cl)_2$. |
| 3 | 1 | 3 | 3 moles neopentane plus $Al_2(CH_3)_3Cl_3$. |
| 4 | 1 | 4 | 4 moles neopentane plus $(AlCH_3Cl_2)_2$. |
| 5 | 1 | 5 | 5 moles neopentane plus $Al_2CH_3Cl_5$. |
| 6 | 1 | 6 | 6 moles neopentane plus $(AlCl_3)_2$. |

The data in the table indicate that all three alkyl groups in the aluminum alkyl were available for the coupling reaction.

EXAMPLE 5

In this example, cyclopentane, a non-polar compound, was used as the solvent, other experimental conditions and quantities were identical to Example 1. Equimolar quantities, of one molar aluminum trimethyl and tert.-butyl chloride solution were reacted at —78° C. No neopentane formation was detected after one hour at this temperature, however, complete conversion to neopentane was found by NMR spectroscopy after 8 hours of storage at this temperature.

EXAMPLE 6

The above reaction was repeated at —25° C. No appreciable reaction occurred at this temperature for 15 minutes. However, when the reaction was subsequently allowed to proceed at —21° C. complete conversion occurred after 10 minutes.

Examples 5 and 6 illustrate that the reaction of the instant invention may proceed in a non-polar solvent if the solvent is inert. It should be noted that the reaction is not as rapid.

What is claimed is:

1. A process for preparing branched hydrocarbons which comprises reacting an organohalide with an organo aluminum within a polar, inert solvent, said organohalide being selected from the group consisting of (a) primary halides having the formula

wherein X is a halogen and $R_1$ is a radical selected from the group consisting of $C_6$ through $C_{20}$ aryl, $C_6$ through $C_{20}$ haloaryl alkyls, $C_3$ through $C_{10}$ isoalkyls and $C_3$ through $C_{10}$ isoalkanyls which are capable of rearranging to a more stable configuration;

(b) secondary halides having the formula

wherein X is a halogen and $R_2$ and $R_3$ are radicals independently selected from the group consisting of $C_6$ through $C_{20}$ aryls, $C_6$ through $C_{20}$ haloaryls, $C_1$ through $C_{10}$ alkyls, $C_2$ through $C_{10}$ alkenyls, $C_1$ through $C_{10}$ primary alkyl halides, $C_2$ through $C_{10}$ primary alkenyl halides, $C_3$ through $C_8$ cycloalkyls and $C_3$ through $C_8$ cycloalkenyls; and (c) tertiary halides having the formula

wherein X is halogen and $R_2$, $R_3$ and $R_4$ are radicals, independently selected from the group consisting of $C_6$ through $C_{20}$ aryls, $C_6$ through $C_{20}$ haloaryls, $C_1$ through $C_{10}$ alkyls, $C_2$ through $C_{10}$ alkenyls, $C_1$ through $C_{10}$ primary alkyl halides, $C_2$ through $C_{10}$ primary alkenyl halides, $C_3$ through $C_8$ cycloalkyls and $C_3$ through $C_8$ cycloalkenyls, and said organo aluminum is selected from the group consisting of (a) triorgano aluminums having the general configuration

wherein $R_5$, $R_6$ and $R_7$ are radicals independently selected from the group consisting of $C_1$ through $C_8$ alkyl, $C_2$ through $C_8$ alkenyl, $C_6$ through $C_{20}$ aryl, $C_3$ through $C_8$ cycloalkyl and $C_3$ through $C_8$ cycloalkenyl;

(b) organo aluminum halides having the configuration $$Al(R_8)_2X$$

wherein X is halogen and $R_8$ is selected from the group consisting of methyl, ethyl and isobutyl; and (c) organo aluminum hydrides having the configuration $Al(R_9)_2H$ wherein $R_9$ is isobutyl.

2. The process of claim 1 wherein said polar, inert solvent has a dielectric constant of at least 8.0 at reaction conditions.

3. The process of claim 2 wherein said solvent is a halogenated hydrocarbon having 1 to 15 carbons.

4. The process of claim 2 wherein said organo halide is a tertiary halide and $R_2$, $R_3$ and $R_4$ are all selected independently from the group consisting of $C_1$ through $C_{10}$ alkyls.

5. The process of claim 4 wherein the organo-aluminum has the general configuration

and $R_5$, $R_6$ and $R_7$ are independently selected from the group consisting of $C_1$ to $C_8$ alkyls.

6. The process of claim 2 wherein said halogen is chlorine.

7. The process of claim 2 wherein said halogen is bromine.

8. The process of claim 2 wherein said reaction takes place at a temperature of about —78° C. to room temperature.

9. The process of claim 2 wherein said solvent is methyl chloride.

10. A process for the preparation of a hydrocarbon containing a quaternary substituted carbon atom which comprises reacting a tertiary organo halide with a trialkyl aluminum within an inert, polar solvent, said tertiary halide being selected from the group consisting of tertiary halides having the formula

wherein X is selected from the group consisting of chlorine, bromine and iodine and $R_2$, $R_3$ and $R_4$ are independently selected from the group consisting of $C_1$ through $C_{10}$ alkyls and said organo aluminum is selected from the group consisting of organo trialuminums having the general configuration

wherein $R_5$, $R_6$ and $R_7$ are independently selected from the group consisting of $C_1$ through $C_8$ alkyls.

11. The process of claim 10 wherein said halogen is chlorine.

12. The process of claim 11 wherein $R_2$, $R_3$ and $R_4$ are independently selected from the group consisting of $C_1$ through $C_3$ alkyls.

13. The process of claim 12 wherein $R_5$, $R_6$ and $R_7$ are independently selected from the group consisting of $C_1$ to $C_3$ alkyls.

14. The process of claim 12 wherein said solvent is methyl chloride.

15. The process of claim 10 wherein said polar, inert solvent has a dielectric constant of at least about 8.0 at reaction conditions.

References Cited

UNITED STATES PATENTS

| | | | |
|---|---|---|---|
| 2,404,599 | 7/1946 | Sanderson | 260—676 |
| 1,325,299 | 12/1919 | Koetschau | 260—676 |
| 2,404,661 | 7/1946 | Sanderson | 260—676 |

OTHER REFERENCES

"Reaction of Trialkylaluminums With Halohydrocarbons," Miller, pp. 908–912, 1965, Journal of Organic Chem., vol. 31, 1966.

DELBERT E. GANTZ, Primary Examiner

G. E. SCHMITKONS, Assistant Examiner